… … …

United States Patent [19]

Timmons et al.

[11] Patent Number: 5,118,893

[45] Date of Patent: Jun. 2, 1992

[54] ZEOLITE CATALYZED CONVERSION OF ACETYLENE

[75] Inventors: Richard B. Timmons; Yigong He; Wen-Long Jang, all of Arlington, Tex.

[73] Assignee: Board of Regents, The University of Texas System, Austin, Tex.

[21] Appl. No.: 705,632

[22] Filed: May 24, 1991

[51] Int. Cl.$^5$ .............................................. C07C 6/00
[52] U.S. Cl. .................................. 585/416; 585/407; 585/418; 502/325
[58] Field of Search ........................................ 585/416

[56] References Cited

U.S. PATENT DOCUMENTS

| | | | |
|---|---|---|---|
| 4,424,401 | 1/1984 | White et al. | 585/416 |
| 4,695,670 | 9/1987 | Seddon | 585/533 |
| 4,704,496 | 11/1987 | Paparizos et al. | 585/500 |
| 4,921,685 | 5/1990 | Peters et al. | 423/439 |
| 4,973,776 | 11/1990 | Allenger et al. | 585/310 |

OTHER PUBLICATIONS

Allenger et al., "The influence of infrared radiation on acetylene conversion," *Fuel*, vol. 66, pp. 435–436 (1987).
Tsai et al., "Reaction of Acetylene over ZSM-5-Type Catalysts," *J. of Catalysis*, vol. 80, pp. 207–214 (1983).
Allenger et al., "Reaction of Acetylene over Fluorinated Alumina Catalysts," vol. 105, pp. 71–80 (1987).
Tedeschi, R. J. in "Acetylene-Based Chemicals from Coal and Natural Sources", Marcel Dekker, Inc., New York, NY 10016, p. 47.
Dejaifve et al., "Reaction Pathways for the Conversion of Methanol and Olefins on H-ZSM-5 Zeolite," *J. of Catalysis*, vol. 63, pp. 331–345 (1980).
Riley et al., "Transition-State Selectivity in the Cracking of n-Heptane over Modified ZSM-5 Catalysts," *J. of Catalysis*, vol. 100, pp. 322–327 (1986).
D. Seddon, "The Conversion of Natural Gas to Transport Fuels: An Appraisal of Present Technology," *BHP Technical Bulletin*, vol. 27, No. 1, pp. 84–88 (1983).
Chevreau et al., "Reactions de condensation de l'acéylène catalysés par les zéolithes Y chromées: influence de l'acidité, aspect cinéique," Bulletin de la Société Chimique de France, No. 3, pp. 483–488 (1988).
Dialog Search Report.
Abstract by Larkins et al., "Catalytic conversion of light hydrocarbons to liquid fuels".
Allenger et al., "Catalyst Deactivation in Acetylene Polymerization," *Applied Catalysis*, vol. 39, pp. 191–211 (1988).

*Primary Examiner*—Asok Pal
*Assistant Examiner*—P. Achutamurthy
*Attorney, Agent, or Firm*—Arnold, White & Durkee

[57] ABSTRACT

The invention relates to an efficient process for the production of higher hydrocarbon from the catalyzed conversion of acetylene. This invention describes the use of a nickel or cobalt-containing zeolite catalyst, coupled with the addition of a hydrogen donor co-reactant to the acetylene feed, to obtain continuous and complete conversion of acetylene to other hydrocarbons. The catalyst/reactant feed process described eliminates rapid catalyst deactivation.

19 Claims, 2 Drawing Sheets

ZEOLITE CATALYZED CONVERSION OF ACETYLENE

BACKGROUND OF THE INVENTION

1. Field of the Invention

The invention relates to a process for the continuous conversion of alkynes to mixtures of aromatics, olefins and paraffins useful as fuels or fuel additives. The process utilizes a shape selective zeolite, modified with a metal such as nickel or cobalt, and requires the addition of a hydrogen containing co-reactant in order to achieve continuous single-step conversion of alkynes to higher hydrocarbon product mixtures.

2. Description of Related Art

The continuous catalyzed conversion of acetylene to higher hydrocarbons has been the subject of numerous studies (Tsai, P. and Anderson, 1983; Allenger, Fairbridge et al, 1987; Allenger, McLean et al, 1987; Allenger, Brown et al, 1988). Interest in this process reflects the fact that successful conversion of this type could serve as a possible source of synthetic fuel (Tsai and Anderson, 1983; Allenger, Fairbridge et al, 1987; Allenger, McLean et al, 1987). The synthetic fuel possibility is centered on the fact that acetylene is obtainable in industrial quantities from coal and methane (Tedeschi, 1982). However, as noted explicitly by previous workers, the unavailability of an effective catalyst for continuous acetylene conversion has prevented development of this alternative fuel route (Tsai and Anderson, 1983; Allenger, Fairbridge et al, 1987; Allenger, McLean et al, 1987).

A difficulty encountered with acetylene, or other simple unsaturated hydrocarbon feedstock conversions, is the rapid deactivation of the catalysts employed. This loss of activity is believed to arise primarily from the rapid polymerization of hydrocarbon feedstocks to polycyclic aromatics. These polycyclic aromatics serve as precursors to coke formation and eventual catalytic deactivation. For example, there is an approximate 70% decrease in acetylene conversion using a ZSM-5 catalyst after only 190 min of on-stream conversion at an acetylene space velocity of 460 hr$^{-1}$ and reaction temperature of 300° C. (Tsai and Anderson, 1983). Similarly, significant decreases in acetylene conversion over amorphous fluorinated alumina catalysts with time on stream have been reported (Allenger, Brown et al, 1988). In the latter case, catalytic deactivation increased rapidly with increasing acetylene concentration in the reactant stream. Similarly, the ZSM-5 catalyzed conversion of acetylene/hydrogen mixtures revealed a 46% decrease in $C_2H_2$ conversion (i.e. from 35.5% to 19%) after only 220 min of on-stream reaction (White et al., 1984).

Zeolite catalyst modification has been explored as a means to alter yield and distribution of aromatized product in feed stream effluents. Nickel-containing zeolites have been tested for ability to convert acetylene to gasoline grade fuel in a single step. Conversion was observed but the yields were low (Seddon, et al, 1986). Zeolite containing framework-incorporated iron is reported to be effective in the conversion of acetylene plus hydrogen mixtures with or without the presence of added water or methanol. However, the conversion effectiveness of this iron containing zeolite is reported to be similar to that of ZSM-5, which exhibits rapid catalytic deactivation. (White et al., 1984) Zeolite catalysts in which cations have been exchanged with $Cr(+3)$ or $Cr(+6)$ ions are known to catalyze the conversion of acetylene to product mixtures containing benzene and alkyl aromatics; however, the catalyst again exhibits rapid deactivation (Chevreau, 1988).

Thus, all previous attempts to achieve continuous catalyzed conversion of acetylene have reported rapid catalytic deactivation. In each case, this loss of catalytic activity is believed to arise from the formation of polycyclic aromatics which, in turn, lead to coke formation on the catalysts. Coke formation in the form of polycyclic aromatics is generally acknowledged to be the prime cause of the surface deactivation of zeolites with consequent decreases in conversion yields.

The desirability of high monocyclic aromatic hydrocarbon content in the acetylene conversion product distribution is based on the octane-enhancing properties of these compounds with respect to the production of synthetic fuels. This property of aromatics is important because of the relatively low octane number of unleaded gasoline due to prohibition of tetraethyl lead addition to increase octane ratings. Therefore efficient processes to provide gasoline fuel mixtures containing aromatics are being sought. Clearly, with respect to the utilization of acetylene for synthetic fuel production, a key aspect of the catalytic conversion upgrade is to generate significant quantities of monocyclic aromatics while simultaneously minimizing formation of the polycyclic aromatics which lead to the catalyst deactivation. This catalyst deactivation has plagued previous attempts at continuous acetylene conversion.

SUMMARY OF THE INVENTION

The present invention is intended to address one or more of the problems encountered in attempting to achieve efficient catalyzed conversion of acetylene or acetylene containing mixtures to lower hydrocarbon fuels. This invention demonstrates that a shape selective zeolite catalyst (e.g. ZSM-5) when appropriately modified by loading with a metal (e.g. nickel or cobalt) is able to catalyze continuous conversion of acetylene to higher hydrocarbons when an appropriate hydrogen atom donor is added to the acetylene flow stream. Most importantly, this invention demonstrates that water functions effectively as a hydrogen atom donor. Additional potential hydrogen atom donors include reactants such as hydrogen, methanol, ethanol, and acetaldehyde. As clearly demonstrated by control experiments, both the added metal atom loading of the catalyst and the addition of the sacrificial hydrogen atom donor to the acetylene flow stream are required in order to maintain continuous catalytic conversion activity. Using this reactant combination, there is little or no loss of catalytic activity during the conversion. Reaction conditions may be manipulated to alter product ratios, particularly to increase the percentage of monocyclic aromatics in the product mixture, thus enhancing potential usefulness as a gasoline fuel or fuel additive.

Overall and in general, the invention comprises a highly efficient process for producing a hydrocarbon fuel. The process is basically a single step involving contacting a feedstock with a metal-containing zeolite catalyst. The feedstock is an alkyne in combination with water or other potential hydrogen atom donors such as methanol, ethanol, propanol, lower molecular weight aldehydes, ketones, acids and the like. It has been found that an alkyne hydrocarbon mixed with water or an alcohol, for example, in the presence of a metal-containing zeolite catalyst such as Ni/ZSM-5/Al$_2$O$_3$ will maintain virtually 100% conversion to higher hydrocarbon products over a relatively long period of time with no substantial deactivation or poisoning of the catalyst.

Low molecular weight alkynes may be used as feedstock components in this process. Examples include acetylene, propyne, 1-butyne, and 2-butyne and the like. Selection of the alkyne is generally made on the basis of economic considerations, with acetylene as a preferred feedstock. Acetylene is readily available, inexpensive and the products resulting from its conversion over the zeolite catalyst are generally considered more economically valuable than acetylene itself. Acetylene is readily available from coal and from natural gas. Acetylene production from coal is achieved via the intermediary formation of calcium carbide as follows (Tedeschi, 1982):

$$CaCO_3 \rightarrow CaO + CO_2$$

$$CaO + coal \rightarrow CaC_2 + CO$$

$$CaC_2 + H_2O \rightarrow Ca(OH)_2 + C_2H_2$$

The CaO feedstock is replenished by dehydration of the Ca(OH)$_2$. Thus the C$_2$H$_2$ production can be viewed simply as a coal+H$_2$O reactant feed conversion process. Alternately, acetylene can be produced from hydrocarbons by short (millisec) high temperature pyrolysis of alkanes (e.g. CH$_4$) followed by rapid thermal quenching to stabilize the acetylene formed (Tedeschi, 1982). This acetylene from alkane synthesis is illustrated for methane as follows:

$$2CH_4 \rightarrow C_2H_2 + 3H_2$$

An important aspect of the invention is the combination of a hydrogen donating compound, such as water, with the basic acetylene feedstock. Other compounds such as hydrogen, alcohols, aldehydes, ketones and acids can also be employed for this purpose. Water is especially preferred for this purpose. The basis of this preference is the availability and cheapness of water, as well as the relatively high product yield of monocyclic aromatic hydrocarbons produced with this reactant. The presence of water, or other hydrogen donating reactants as noted above, or combinations of these reactants in the feedstock mix is believed to be important because it prevents polymerization of the feedstock hydrocarbon into condensed aromatic ring compounds which may lead to coke formation. Zeolite catalysts are known to be particularly susceptible to poisoning from coke formation.

Surprisingly, unmodified zeolite catalysts do not provide continuous efficient catalytic conversion of acetylene, even when the appropriate hydrogen donor co-reactant is added to the reactant feed. However, loading the zeolite catalyst with a metal such as nickel or cobalt provides efficient conversion of acetylene feedstocks when the added hydrogen donor reactant is also present. It is well documented that zeolite catalysts used in conversion of acetylene to higher hydrocarbons are poisoned and have a relatively short lifetime. This poisoning is observed even when relatively large amounts of hydrogen are added to the acetylene feedstock (White, 1984). It is believed that polymerized aromatic hydrocarbons adhere to the catalytic surface blocking access of the reactant molecules to the active sites.

Unexpectedly, nickel and cobalt-modified ZSM-5 zeolite catalyzed conversions of acetylene/H$_2$O feedstocks proceed efficiently for long periods of time. Nickel-containing ZSM-5 is a preferred catalyst when more than 5% nickel is present. In a most preferred embodiment, the catalyst contains about 13% nickel. This is not to say that in some applications higher nickel concentrations would not be preferred, particularly in view of the comparable results obtained with nickel loading of ZSM-5 up to 20%.

It has been found that a metal loaded zeolite catalyst and added hydrogen donating reactant are required in order to achieve an efficient continuous conversion of acetylene. In the presence of an unmodified ZSM-5 catalyst (that is, one without added metal atom loading), catalyst deactivation is rapid even when water and/or methanol and/or hydrogen is added to the acetylene feedstock. In the absence of the metal loading of the catalyst, unsaturated lower molecular weight feedstock hydrocarbons such as acetylene polymerize to form coke precursors. However, it is also important to note that in the absence of the added hydrogen donor reactant (e.g. water), the metal loaded zeolite catalytic activity decreases rapidly with time on stream in the conversion of pure acetylene. Thus both the metal atom loading of the zeolite and the addition of a co-feed hydrogen donor reactant are required in order to eliminate catalyst deactivation. The presence of the metal atoms (e.g. nickel) combined with the added hydrogen donor reactant (e.g. water) apparently function to limit the formation of structures having high carbon to hydrogen ratios, particularly fused-ring compounds.

Although the invention has been demonstrated with nickel or cobalt-containing zeolite catalyzed conversion of alkyne feedstocks, other transition metals could be expected to replace nickel or cobalt. Catalytic properties of transition metals are well known and other metals such as zinc, chromium, iron, copper, platinum, palladium, gold, rhodium, and the like could be introduced into the zeolite and reduced to deposit the metal onto the framework.

The feedstock used in the disclosed process is heated to a relatively low temperature of 300°–400° C. Higher temperatures are not required in order to maintain conversions near 100%. Furthermore, increased pressures are not necessary and virtually complete conversion occurs at normal atmospheric pressure. Efficient continuous 100% conversion of acetylene to hydrocarbons has occurred for over 26 hrs at an acetylene space velocity of 2100 hr$^{-1}$ and a reaction temperature of 350° C.

Yet another aspect of the invention is a composition which includes the nickel-containing ZSM-5 zeolite catalysts. As used in the present invention, nickel content is about 13% and the silica to alumina ratio of the ZSM-5 matrix is between about 30 and 100, preferably with a silica to alumina ratio of about 30. It is understood, however, that acceptable variations of modified zeolite catalysts might include various other metals reasonably accepted as catalysts, such as platinum, palladium, iron and the like. Although demonstrated with ZSM-5, other zeolites could be employed such as ZSM-11, ZSM-12, ZSM-22, ZSM-23, and the like. Ratios of silica to alumina in the range of 30 should not be considered limiting as reasonable experimentation could determine that desirable results, albeit different, are attainable with silica to alumina below 30 or above 100.

Yet another aspect of the invention is a hydrocarbon fuel mixture produced by the process described. Generally this mixture will include lower alkyl hydrocarbons, monocyclic aromatic hydrocarbons and paraffins. In most preferred practice, a feedstream comprising acetylene and water is contacted with a nickel modified zeolite catalyst at a temperature of about 350°–400° C. at atmospheric pressure. A hydrocarbon mixture is produced which has about 30% of its total as monocyclic aromatic hydrocarbons. The aromatic yield remains relatively constant with time, although there is a slow decrease in the olefin to paraffin ratio. The aromatic fraction is almost exclusively monocyclic, typically composed of benzene, toluene, xylenes, and so forth, with less than 3% of the total hydrocarbons being polycyclic compounds.

DETAILED DESCRIPTION OF PREFERRED EMBODIMENTS

Figure 1:
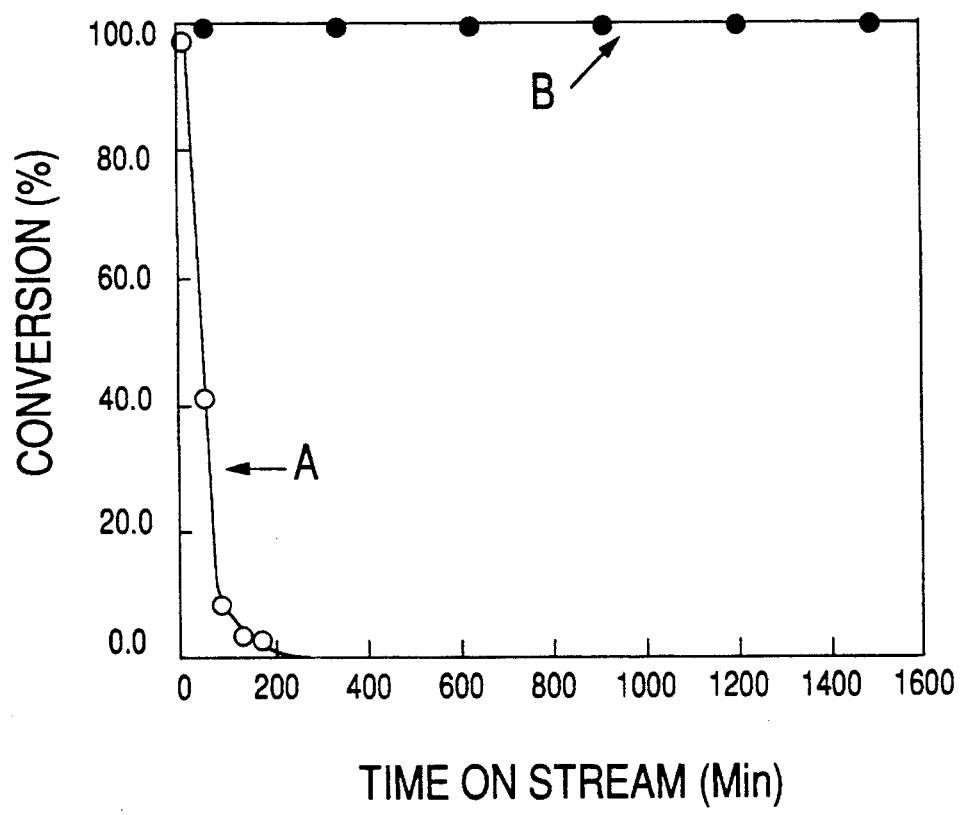
FIG. 1 shows a comparison of catalytic lifetimes for H-ZSM-5 unmodified (curve A) and modified (curve B) in acetylene conversion.

The invention is a process for highly efficient conversion of alkyne feedstocks to products comprising aromatics, paraffins and olefins. Surprisingly, the combination of a metal modified zeolite catalyst and a feedstock containing a hydrogen donor co-reactant not only provides an efficient conversion of the alkyne but also virtually eliminates catalyst deactivation. Process efficiency has been maintained near 100% for periods of at least 26 hrs. In contrast, non-zeolite catalysts or zeolite catalysts lacking, as an example, nickel or cobalt, tend to rapidly lose efficiency, often within 15 min.

It should be understood that with a reasonable amount of testing, parameters such as temperature, pressure, feedstock combinations, etc., could be optimized to desired product compositions and ratios. For example, the 13.1% Ni/ZSM-5/Al$_2$O$_3$, under conditions specified in Table 6 produces over 25% product as an aromatic component, mostly monocyclic aromatics. In the presence of hydrogen, this amount is decreased but there is an increase in olefinic products. Therefore, product ratios may be varied in accordance with needs. The role of the added Al$_2$O$_3$ is to function primarily as a binder, increasing the available zeolite surface area.

In this regard, the nature of the catalyst is expected to have an influence on conversions. Other zeolites containing nickel or other transition metals might be useful in altering compositions, rates or products.

While there are numerous process variations, the invention may be practiced as essentially a single-step conversion of a selected feedstock. As an example, acetylene and water are mixed for use in a continuous feed at 350° C. under normal atmospheric pressure. Selectivity for aromatics is high, over one third of the product, of which one third is toluene.

REACTOR

A fixed-bed continuous flow microreactor operating at atmospheric pressure was packed with catalyst loaded into the center of a ¼ inch × 6 inch stainless-steel reactor tubes mounted vertically in a bored cylindrical block aluminum furnace. Reactant gas flows were measured using calibrated flow meters. In runs employing liquid reactants (e.g., $H_2O$ and/or $CH_3OH$), reactant $C_2H_2$ gas was bubbled through thermostatted containers of the liquids. The amount of liquid reactant thus provided as vapor was determined by careful periodic weighing of the liquid-containing vessels. All data were acquired using 0.400 g of catalyst.

PRODUCT MEASUREMENTS

Reaction products (including any unreacted starting materials) were determined by on-line gas chromatography using a capillary GS-Q column for mixture separation and a flame ionization detector. The hydrocarbon products were identified by comparison of GC retention times with those of standard samples. GC response factors for quantitation of products and reactants were determined from measurements of known amounts of pure compounds. Reaction product distributions were recorded relative to product selectivities expressed as carbon atom number.

EXAMPLE 1

Preparation of Ni/ZSM-5/Al$_2$O$_3$

ZSM-5 (for example, as provided by Mobil) with a silicon to aluminum ratio of 30 was modified as follows: Na$^+$ ions initially present were exchanged for NH$_4^+$ using ion-exchange in a (NH$_4$)$_2$SO$_4$ solution. The resulting NH$_4$-ZSM-5 was dried at 120° C. and subsequently calcined at 550° C. for 3 hrs. The resulting H-ZSM-5 catalyst was treated with 0.5 M HNO$_3$ at 70° C. for 4 hrs, filtered, dried and mixed with Al(OH)$_3$ powder. The amount of Al(OH)3 employed was adjusted to provide a zeolite catalyst-aluminum oxide binder ratio of 40:60. The H-ZSM-5/Al$_2$O$_3$ mixture was added to a Ni(NO$_3$)$_2$ solution, the pH adjusted to approximately 2 and the resulting solution evaporated to dryness. The Ni loading of the final catalyst is determined by the concentration of the Ni(NO$_3$)$_2$ solution employed. The Ni(NO$_3$)$_2$/H-ZSM-5/Al$_2$O$_3$ mixture was then calcined at 550° C. for 2 hrs to convert Ni(NO$_3$)$_2$ to nickel oxide. The resulting solid was pelletized, cracked and then screened to 20–40 mesh size. Before use, the NiO catalyst component was reduced with hydrogen using a temperature-programmed reduction. The percent Ni loading was determined according to the following formula:

$$\% \, Ni \left( \frac{wt \, Ni}{Wt \, H\text{-}ZSM\text{-}5 \, + \, wt \, Al_2O_3} \right) \times 100$$

EXAMPLE 2

13.3% Ni/H-ZSM/Al$_2$O$_3$ Catalyzed Conversion of Acetylene

A reactant feed gas of acetylene and water was obtained by bubbling acetylene through a thermostatted vessel containing water. The effluent gas mixture of $C_2H_2$ and $H_2O$ was fed directly to the catalyst, Ni/H-ZSM-5/Al$_2$O$_3$ containing 13.3% Ni relative to the ZSM-5/Al$_2$O$_3$, prepared as described in Example 1, using a heat transfer line to prevent condensation. The reaction was carried out in a fixed-bed continuous flow microreactor at 1 atm pressure. The reaction was conducted for 26 hrs at a $C_2H_2$ space velocity of 2100 hr$^{-1}$ and a reaction temperature of 350° C.

Figure 2:
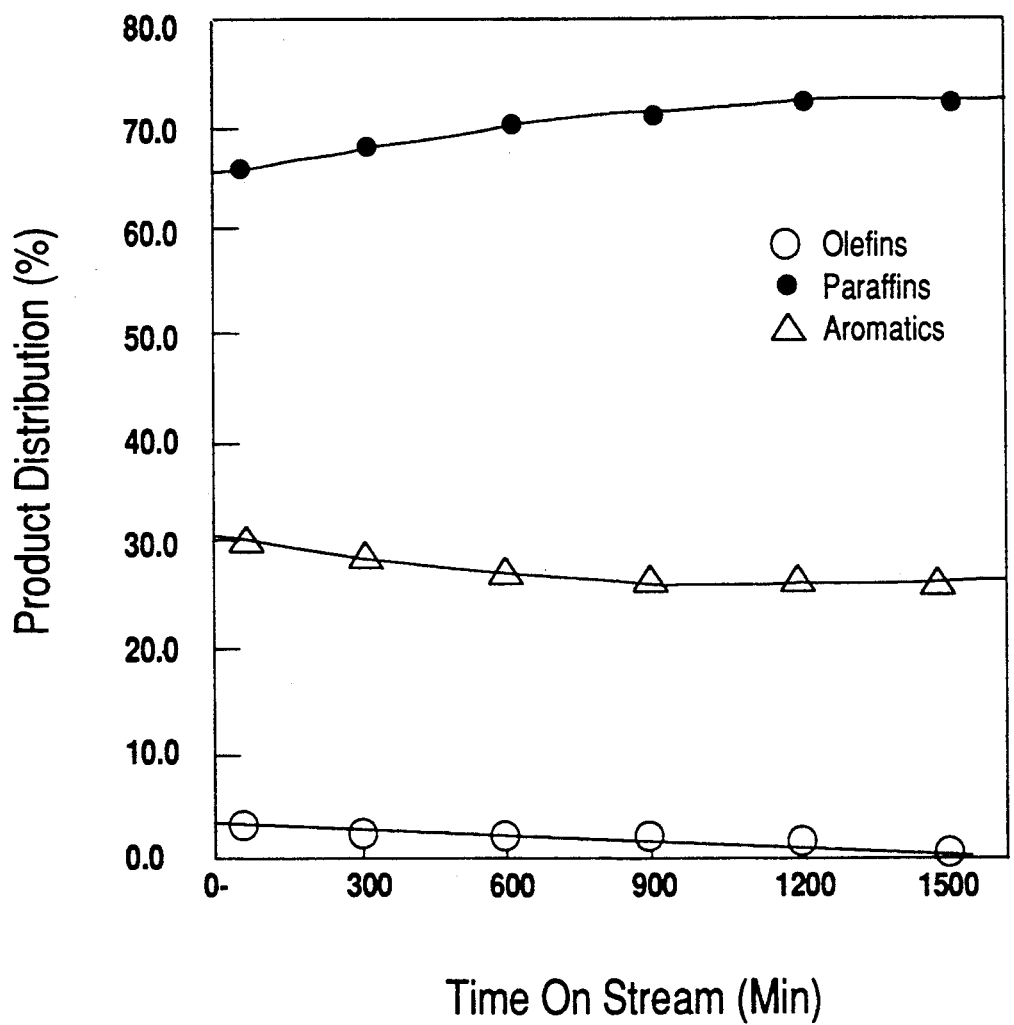
FIG. 2 shows hydrocarbon product distribution obtained in $C_2H_2$ conversion as a function of time on-stream.

FIG. 1, curve B, shows that 100% conversion is maintained for over 26 hrs under these conditions. Product distribution, shown in FIG. 2, indicate relative amounts in terms of total olefins, paraffins and aromatics. As shown in FIG. 2, the aromatic yield remained relatively constant with time while a slow decrease in olefin/paraffin ratio was noted. The aromatic fraction consisted almost exclusively of monocyclic compounds, mainly benzene, toluene, xylenes, etc. with less than 3% of total aromatics as polycyclic compounds.

Table 1 illustrates results of using Ni/H-ZSM-5/Al$_2$O$_3$ to convert acetylene to products over a period up to 260 min. In the absence of added water, conversion efficiency drastically decreased with time. Although the aromatic yield was initially high, there was a sharp decrease in percentage yield over time.

TABLE 1

Ni/ZSM-5/Al$_2$O$_3$[a] catalyzed conversion of C$_2$H$_2$

| Feed: | | | | | |
|---|---|---|---|---|---|
| C$_2$H$_2$ (ml/min) | 20 | 20 | 20 | 20 | 20 |
| H$_2$O (mg/min) | 0.0 | 0.0 | 0.0 | 0.0 | 0.0 |
| Time on-stream (min) | 10 | 60 | 140 | 200 | 260 |
| Temperature (°C.) | 350 | 350 | 350 | 350 | 350 |
| WHSV (1/hr) | 3.2 | 3.2 | 3.2 | 3.2 | 3.2 |
| Conversion (%) | 100.0 | 22.5 | 11.4 | 6.0 | 2.7 |
| Hydrocarbon[b] Distribution (%) | | | | | |
| Olefins | | | | | |
| C$_2$ | 0.0 | 0.1 | 0.1 | 0.0 | 0.0 |
| C$_3$ | 2.6 | 18.4 | 23.8 | 27.1 | 29.8 |
| C$_4$ | 2.4 | 4.7 | 5.4 | 6.1 | 7.2 |
| C$_{5+}$ | 1.4 | 10.4 | 11.1 | 12.6 | 14.0 |
| Selectivity (%) | 6.5 | 33.6 | 40.3 | 45.8 | 51.0 |
| Paraffins | | | | | |
| C$_1$ | 12.8 | 3.0 | 3.5 | 5.1 | 6.7 |
| C$_2$ | 6.2 | 3.4 | 2.1 | 0.9 | 0.5 |
| C$_3$ | 7.0 | 5.7 | 3.8 | 2.9 | 3.4 |
| C$_4$ | 4.1 | 4.3 | 8.9 | 11.4 | 13.9 |
| C$_{5-}$ | 1.5 | 5.2 | 6.8 | 8.7 | 10.1 |
| Selectivity (%) | 31.6 | 21.6 | 25.1 | 29.0 | 34.6 |
| Aromatics | | | | | |
| Benzene | 14.1 | 2.9 | 1.5 | 0.7 | 0.2 |
| Toluene | 20.5 | 8.6 | 5.4 | 1.8 | 0.4 |
| Ethyl benzene | 1.4 | 0.6 | 0.2 | 0.1 | 0.0 |
| p + m-Xylene | 12.8 | 10.1 | 7.4 | 4.2 | 1.8 |
| o-Xylene | 1.7 | 2.9 | 1.4 | 0.7 | 0.1 |
| Ethyl toluene | 2.1 | 4.3 | 3.6 | 2.0 | 0.3 |
| Trimethylbenzene | 3.2 | 6.2 | 5.1 | 2.4 | 0.8 |
| Fused-ring aromatics | 6.2 | 9.3 | 10.0 | 13.3 | 13.2 |
| Selectivity (%) | 62.0 | 44.9 | 34.6 | 25.2 | 14.4 |

[a]13.1% Ni/H-ZSM-5 — Al$_2$O$_3$ ZSM-5/Al$_2$O$_3$ = 40:60.
[b]Percentage based on carbon number of compound.

EXAMPLE 3

Comparison of Catalysts for Acetylene Conversion

Various catalysts were used to compare conversion of acetylene to lower hydrocarbons. Except for the catalyst, experiments were run under the same conditions described in Example 2. As shown in Tables 2–4, Ni/Al$_2$O$_3$, Al$_2$O$_3$, and H-ZSM-5/Al$_2$O$_3$ are not effective catalysts for the conversion of acetylene/water feedstocks to hydrocarbon products. Results using H-ZSM-5 are shown in FIG. 1.

H-ZSM-5 Catalyst

A comparison experiment was conducted using H-ZSM-5 instead of Ni/H-ZSM-5/Al$_2$O$_3$. Results are shown in FIG. 1, curve A. Conversion rates drop to zero after 225 min.

13.1% Ni/Al$_2$O$_3$ Catalyst

Table 2 shows the results of attempting to convert a fixed feed ratio of acetylene/water to hydrocarbon products with a catalyst which contains Ni and Al$_2$O$_3$ but no zeolite. As shown, the present conversion of acetylene is very small.

TABLE 2

| Ni/Al$_2$O$_3$ catalyst[a] | | | |
|---|---|---|---|
| Feed: | | | |
| C$_2$H$_2$ (ml/min) | 20 | 20 | 20 |
| H$_2$O (mg/min) | 4.7 | 4.7 | 4.7 |
| Time on-stream (min) | 15 | 180 | 360 |
| Temperature (°C.) | 350 | 350 | 350 |
| WHSV (1/hr) | 3.2 | 3.2 | 3.2 |
| Conversion (%) | 2.1 | 2.0 | 1.5 |

[a]13.1% Ni/Al$_2$O$_3$.

Al$_2$O$_3$ Catalyst

Table 3 illustrates the conversion of a fixed ratio of acetylene/water using Al$_2$O$_3$. Conversion was negligible.

TABLE 3

| Al$_2$O$_3$ catalyzed conversion of C$_2$H$_2$/H$_2$O | | | |
|---|---|---|---|
| Feed: | | | |
| C$_2$H$_2$ (ml/min) | 20 | 20 | 20 |
| H$_2$O (mg/min) | 4.7 | 4.7 | 4.7 |
| Time on-stream (min) | 15 | 180 | 360 |
| Temperature (°C.) | 350 | 350 | 350 |
| WHSV (1/hr) | 3.2 | 3.2 | 3.2 |
| Conversion (%) | 0.4 | 0.3 | 0.5 |

H-ZSM-5/Al$_2$O$_3$ Catalyst

Table 4 shows the conversion of a fixed ratio of acetylene/water using H-ZSM-5/Al$_2$O$_3$. Initial conversion yields were low and decreased further with time. The majority of products formed were aromatics.

Table 5 indicates initial efficient conversion of acetylene to hydrocarbon products in the presence of water and hydrogen; however, catalyst inactivation is observed in less than one hr of on-stream reaction. In the initial conversion, the majority of products are aromatic. With decreased product yield, paraffins and olefins are the main products detected.

TABLE 4

H-ZSM-5/Al$_2$O$_3$[a] catalyzed conversion of C$_2$H$_2$/H$_2$O

| Feed: | | | | | |
|---|---|---|---|---|---|
| C$_2$H$_2$ (ml/min) | 20.0 | 20.0 | 20.0 | 20.0 | 20.0 |
| H$_2$ (ml/min) | 0.0 | 0.0 | 0.0 | 0.0 | 0.0 |
| H$_2$O (mg/min) | 4.7 | 4.7 | 4.7 | 4.7 | 4.7 |
| Time on-stream (min) | 12 | 60 | 120 | 200 | 300 |
| Reaction temperature (°C.) | 350 | 350 | 350 | 350 | 350 |
| WHSV of C$_2$H$_2$ (1/hr) | 3.2 | 3.2 | 3.2 | 3.2 | 3.2 |
| Conversion (%) | 7.2 | 3.4 | 2.2 | 2.0 | 1.3 |
| Hydrocarbon[b] Distribution (%) | | | | | |
| Olefins | | | | | |
| C$_2$ | 0.1 | 0.1 | 0.2 | 0.1 | 0.0 |
| C$_3$ | 0.2 | 0.1 | 0.2 | 0.1 | 0.1 |
| C$_4$ | 4.6 | 4.2 | 4.3 | 2.9 | 2.1 |
| C$_{5+}$ | 0.5 | 0.4 | 0.4 | 0.3 | 0.2 |
| Selectivity (%) | 5.4 | 4.8 | 5.1 | 3.4 | 2.4 |
| Paraffins | | | | | |
| C$_1$ | 0.1 | 0.1 | 0.2 | 0.0 | 0.0 |
| C$_2$ | 0.2 | 0.1 | 0.0 | 0.0 | 0.0 |
| C$_3$ | 7.2 | 6.0 | 4.2 | 3.9 | 3.0 |

TABLE 4-continued

H-ZSM-5/Al$_2$O$_3$$^a$ catalyzed conversion of C$_2$H$_2$/H$_2$O

| | | | | | |
|---|---|---|---|---|---|
| C$_4$ | 14.5 | 13.7 | 12.5 | 10.4 | 9.7 |
| C$_{5+}$ | 0.7 | 0.6 | 0.5 | 0.4 | 0.3 |
| Selectivity (%) | 22.7 | 20.5 | 17.4 | 14.8 | 13.0 |
| Aromatics | | | | | |
| Benzene | 1.2 | 0.7 | 0.5 | 0.3 | 0.2 |
| Toluene | 3.8 | 2.6 | 2.2 | 1.3 | 0.4 |
| Ethyl benzene | 0.2 | 0.1 | 0.0 | 0.0 | 0.0 |
| p + m-Xylene | 10.4 | 9.8 | 8.8 | 4.2 | 3.8 |
| o-Xylene | 1.4 | 1.2 | 1.0 | 0.6 | 0.4 |
| Ethyl toluene | 0.7 | 0.6 | 0.5 | 0.4 | 0.2 |
| Trimethylbenzene | 1.1 | 1.1 | 0.9 | 0.6 | 0.3 |
| Fused-ring aromatics | 53.1 | 58.6 | 63.8 | 74.4 | 79.3 |
| Selectivity (%) | 71.9 | 74.7 | 77.7 | 81.8 | 84.6 |

$^a$0.0% Ni/H-ZSM-5 + Al$_2$O$_3$ ZSM-5/Al$_2$O$_3$ = 40:60.
$^b$Percentage based on carbon number of compound.

TABLE 5

H-ZSM-5/Al$_2$O$_3$$^a$ catalyzed conversion of C$_2$H$_2$/H$_2$O/H$_2$

| Feed: | | | | | |
|---|---|---|---|---|---|
| C$_2$H$_2$ (ml/min) | 5.0 | 5.0 | 5.0 | 5.0 | 5.0 |
| H$_2$ (ml/min) | 15.0 | 15.0 | 15.0 | 15.0 | 15.0 |
| H$_2$O (mg/min) | 2.7 | 2.7 | 2.7 | 2.7 | 2.7 |
| Time on-stream (min) | 15 | 80 | 160 | 240 | 320 |
| Reaction temperature (°C.) | 350 | 350 | 350 | 350 | 350 |
| WHSV of C$_2$H$_2$ (1/hr) | 0.8 | 0.8 | 0.8 | 0.8 | 0.8 |
| Conversion (%) | 85.1 | 12.5 | 5.4 | 4.0 | 2.4 |
| Hydrocarbon$^b$ Distribution (%) | | | | | |
| Olefins | | | | | |
| C$_2$ | 0.1 | 0.1 | 0.2 | 0.3 | 0.4 |
| C$_3$ | 4.8 | 20.9 | 24.7 | 27.9 | 29.5 |
| C$_4$ | 4.6 | 3.2 | 5.2 | 5.9 | 6.9 |
| C$_{5+}$ | 3.5 | 11.4 | 12.1 | 12.8 | 13.7 |
| Selectivity (%) | 13.0 | 35.6 | 42.2 | 46.9 | 50.5 |
| Paraffins | | | | | |
| C$_1$ | 3.1 | 2.4 | 3.2 | 5.5 | 6.4 |
| C$_2$ | 4.4 | 2.5 | 1.1 | 0.7 | 0.3 |
| C$_3$ | 6.2 | 4.0 | 4.8 | 3.9 | 3.0 |
| C$_4$ | 2.4 | 5.1 | 7.9 | 12.4 | 13.7 |
| C$_{5+}$ | 5.2 | 5.8 | 6.9 | 7.7 | 9.8 |
| Selectivity (%) | 21.3 | 19.5 | 23.9 | 30.2 | 33.2 |
| Aromatics | | | | | |
| Benzene | 7.2 | 1.7 | 1.3 | 0.6 | 0.2 |
| Toluene | 16.8 | 4.6 | 2.4 | 1.3 | 0.4 |
| Ethyl benzene | 2.1 | 0.2 | 0.1 | 0.0 | 0.0 |
| p + m-Xylene | 15.4 | 17.8 | 11.4 | 5.2 | 1.8 |
| o-Xylene | 4.8 | 3.9 | 1.5 | 0.4 | 0.1 |
| Ethyl toluene | 5.8 | 4.3 | 3.4 | 1.0 | 0.3 |
| Trimethylbenzene | 6.1 | 4.2 | 3.1 | 1.4 | 0.8 |
| Fused-ring aromatics | 7.6 | 8.3 | 10.9 | 13.3 | 12.8 |
| Selectivity (%) | 65.8 | 45.0 | 34.1 | 23.2 | 16.3 |

$^a$ZSM-5/Al$_2$O$_3$ = 40:60.
$^b$Percentage based on carbon number of compound.

The data in Tables 1-5 illustrate that various catalysts and reactant combinations employed are not capable of maintaining sustained 100% acetylene conversion for any reasonable length of time-on-stream reaction. These catalysts/reactant combinations are summarized in Table 6.

TABLE 6

| Catalyst | Reactant Feed | Activity |
|---|---|---|
| Ni/ZSM-5/Al$_2$O$_3$ | C$_2$H$_2$ | High initial catalytic activity but rapid catalytic inactivation |
| Ni/Al$_2$O$_3$ (no ZSM-5) | C$_2$H$_2$ + H$_2$O | Negligible catalytic activity |
| Al$_2$O$_3$ (no Ni or ZSM-5) | C$_2$H$_2$ + H$_2$O | Negligible catalytic activity |
| ZSM-5/Al$_2$O$_3$ (no Ni) | C$_2$H$_2$ + H$_2$O | Very low initial activity with continued decrease in catalytic activity with time on-stream |
| ZSM-5/Al$_2$O$_3$ (no Ni) | C$_2$H$_2$ + H$_2$O + H$_2$ | High initial catalytic activity but rapid catalytic inactivation |

EXAMPLE 4

Effect of Feedstock Modification

Tables 7-14 show results obtained using the conditions described in Example 2 to convert acetylene to a hydrocarbon product, except that water, hydrogen, methane, methanol or acetaldehyde combinations were added to the feedstock. For comparison, Table 1 shows results obtained when the feedstock is composed only of acetylene without any water.

Table 7 indicates that product distribution is relatively constant and maintained over a long period when water is added to the hydrocarbon feedstock.

Table 8 shows variation of the initial product distributions as a function of the water/acetylene ratio. Product distributions represent those obtained during the first 90 min of the reaction, with the exception of the run with zero added water which represents only 10 min of conversion.

Table 9 illustrates the substitution of methanol for water. Long term stability is obtained. Aromatic product distribution, unlike distribution with an acetylene and water feedstock, varies with time on stream.

Table 10 shows conversion of acetylene to hydrocarbon products using gaseous hydrogen in place of water. Aromatic product percent is less than half that obtained with water/acetylene feedstocks.

Table 11 illustrates results obtained with water/methanol/acetylene feedstocks. Product distribution is generally similar to that obtained with feedstocks of water/acetylene.

Table 12 shows results with a water/hydrogen/acetylene feedstock. 100% conversion is maintained over the tested period. Product distribution is similar to those obtained with water/acetylene or methanol/acetylene feedstocks, notably in aromatic product distribution.

Table 13 indicates that the effect of adding methane to a water/acetylene feedstock reduces aromatic product yield. The high yield of C$_1$ paraffin indicates that little of the added methane is consumed.

Table 14 shows results with an acetaldehyde/acetylene feedstock. Essentially complete acetylene conversion is maintained over the listed period. Product distribution is similar to that obtained with water/acetylene or methanol/acetylene feedstocks.

TABLE 7

Ni/ZSM-5/Al$_2$O$_3$$^a$ catalyzed conversion of C$_2$H$_2$/H$_2$O

| Feed: | | | | | | |
|---|---|---|---|---|---|---|
| C$_2$H$_2$ (ml/min) | 20 | 20 | 20 | 20 | 20 | 20 |
| H$_2$O (mg/min) | 4.7 | 4.7 | 4.7 | 4.7 | 4.7 | 4.7 |
| Time on-stream (min) | 60 | 300 | 600 | 900 | 1200 | 1500 |

TABLE 7-continued

| Ni/ZSM-5/Al$_2$O$_3$$^a$ catalyzed conversion of C$_2$H$_2$/H$_2$O | | | | | | |
|---|---|---|---|---|---|---|
| Temperature (°C.) | 350 | 350 | 350 | 350 | 350 | 350 |
| WHSV (1/hr) | 3.2 | 3.2 | 3.2 | 3.2 | 3.2 | 3.2 |
| Conversion (%) | 100 | 100 | 100 | 100 | 100 | 100 |
| Hydrocarbon$^b$ | | | | | | |
| Distribution (%) | | | | | | |
| Olefins | | | | | | |
| C$_2$ | 0.1 | 0.0 | 0.1 | 0.2 | 0.1 | 0.0 |
| C$_3$ | 1.5 | 1.7 | 1.4 | 0.8 | 0.3 | 0.3 |
| C$_4$ | 0.2 | 0.2 | 0.3 | 0.5 | 0.2 | 0.2 |
| C$_{5+}$ | 1.5 | 0.3 | 0.3 | 0.4 | 0.3 | 0.2 |
| Selectivity (%) | 3.3 | 2.2 | 2.1 | 1.9 | 0.9 | 0.7 |
| Paraffins | | | | | | |
| C$_1$ | 22.9 | 32.6 | 41.2 | 48.9 | 53.5 | 54.1 |
| C$_2$ | 17.9 | 17.4 | 14.8 | 11.7 | 9.0 | 8.2 |
| C$_3$ | 15.8 | 13.1 | 11.9 | 9.7 | 9.0 | 9.6 |
| C$_4$ | 9.4 | 5.6 | 2.5 | 1.1 | 1.1 | 0.9 |
| C$_{5+}$ | 0.4 | 0.2 | 0.2 | 0.2 | 0.1 | 0.1 |
| Selectivity (%) | 66.4 | 68.9 | 70.6 | 71.6 | 72.7 | 72.9 |
| Aromatics | | | | | | |
| Benzene | 7.4 | 7.8 | 7.9 | 8.1 | 9.4 | 10.5 |
| Toluene | 10.3 | 10.5 | 9.3 | 9.2 | 8.7 | 7.9 |
| Ethyl benzene | 0.4 | 0.3 | 0.3 | 0.2 | 0.2 | 0.1 |
| p + m-Xylene | 6.1 | 4.5 | 3.7 | 3.0 | 2.4 | 2.1 |
| o-Xylene | 1.4 | 1.1 | 1.0 | 0.7 | 0.6 | 0.5 |
| Ethyl toluene | 1.9 | 1.6 | 1.4 | 1.0 | 0.6 | 0.3 |
| Trimethylbenzene | 2.1 | 1.9 | 1.7 | 1.5 | 0.7 | 0.5 |
| Fused-ring aromatics | 0.5 | 1.2 | 2.2 | 3.0 | 3.9 | 4.5 |
| Selectivity (%) | 30.1 | 28.9 | 27.5 | 26.7 | 26.5 | 26.4 |

$^a$13.1% Ni/H-ZSM-5 + Al$_2$O$_3$ ZSM-5/Al$_2$O$_3$ = 40:60.
$^b$Percentage based on carbon number of compound.

TABLE 8

| Product distributions in presence of Ni/ZSM-5/Al$_2$O$_3$$^a$ as a function of water/acetylene ratio | | | | | | |
|---|---|---|---|---|---|---|
| Feed: | | | | | | |
| C$_2$H$_2$ (ml/min) | 20 | 20 | 20 | 20 | 20 | 20 |
| H$_2$O (mg/min) | 0.0 | 1.3 | 2.7 | 4.7 | 9.6 | 21.6 |
| H$_2$O/C$_2$H$_2$ | 0.00$^d$ | 0.10$^c$ | 0.20$^c$ | 0.37$^c$ | 0.78$^c$ | 1.74$^c$ |
| Temperature (°C.) | 350 | 350 | 350 | 350 | 350 | 350 |
| WHSV (1/hr) | 3.2 | 3.2 | 3.2 | 3.2 | 3.2 | 3.2 |
| Conversion (%) | 100 | 100 | 100 | 100 | 100 | 100 |
| Hydrocarbon$^b$ | | | | | | |
| Distribution (%) | | | | | | |
| Olefins | | | | | | |
| C$_2$ | 0.1 | 0.3 | 0.2 | 0.1 | 0.1 | 0.0 |
| C$_3$ | 2.6 | 0.5 | 1.4 | 2.4 | 0.6 | 0.7 |
| C$_4$ | 2.4 | 0.7 | 0.7 | 0.8 | 0.1 | 0.5 |
| C$_{5+}$ | 1.4 | 0.5 | 0.1 | 0.6 | 0.2 | 0.2 |
| Selectivity (%) | 6.5 | 2.0 | 2.4 | 3.9 | 1.0 | 1.4 |
| Paraffins | | | | | | |
| C$_1$ | 12.8 | 53.0 | 45.8 | 33.1 | 26.8 | 27.4 |
| C$_2$ | 6.2 | 11.1 | 12.8 | 14.4 | 15.8 | 16.4 |
| C$_3$ | 7.0 | 10.0 | 12.5 | 13.1 | 14.3 | 15.2 |
| C$_4$ | 4.1 | 2.4 | 3.1 | 5.9 | 8.2 | 9.0 |
| C$_{5+}$ | 1.5 | 0.3 | 0.2 | 0.5 | 0.3 | 0.7 |
| Selectivity (%) | 31.6 | 76.8 | 74.4 | 67.0 | 65.4 | 68.7 |
| Aromatics | | | | | | |
| Benzene | 14.1 | 6.0 | 7.1 | 6.7 | 5.6 | 6.6 |
| Toluene | 20.5 | 6.2 | 7.7 | 10.4 | 11.9 | 11.3 |
| Ethyl benzene | 1.4 | 0.1 | 0.5 | 0.6 | 1.4 | 1.0 |
| p + m-Xylene | 12.8 | 2.5 | 3.4 | 4.2 | 7.8 | 5.8 |
| o-Xylene | 1.7 | 0.4 | 0.8 | 1.0 | 1.1 | 1.5 |
| Ethyl toluene | 2.1 | 0.8 | 0.9 | 2.6 | 2.8 | 1.2 |
| Trimethylbenzene | 3.2 | 1.1 | 0.6 | 2.7 | 2.5 | 2.2 |
| Fused-ring aromatics | 6.2 | 4.4 | 2.4 | 1.0 | 0.6 | 0.3 |
| Selectivity (%) | 62.0 | 21.5 | 23.4 | 29.2 | 33.7 | 29.9 |

$^a$13.1% Ni/H-ZSM-5 + Al$_2$O$_3$ ZSM-5/Al$_2$O$_3$ = 40:60.
$^b$Percentage based on carbon number of compound.
$^c$Time on stream: 90 min.
$^d$time on stream: 10 min.

TABLE 9

| Ni/ZSM-5/Al$_2$O$_3$$^a$ catalyzed conversion of C$_2$H$_2$/CH$_3$OH |
|---|
| Feed: |

TABLE 9-continued

Ni/ZSM-5/Al$_2$O$_3$[a] catalyzed conversion of C$_2$H$_2$/CH$_3$OH

| | | | | | | |
|---|---|---|---|---|---|---|
| C$_2$H$_2$ (ml/min) | 20 | 20 | 20 | 20 | 20 | 20 |
| CH$_3$OH (mg/min) | 22 | 22 | 22 | 22 | 22 | 22 |
| Time on-stream (min) | 15 | 80 | 180 | 260 | 380 | 480 |
| Temperature (°C.) | 350 | 350 | 350 | 350 | 350 | 350 |
| WHSV of C$_2$H$_2$ (1/hr) | 3.2 | 3.2 | 3.2 | 3.2 | 3.2 | 3.2 |
| Conversion (%) | 100 | 100 | 100 | 100 | 100 | 100 |
| Hydrocarbon[b] | | | | | | |
| Distribution (%) | | | | | | |
| Olefins | | | | | | |
| C$_2$ | 0.1 | 0.1 | 0.2 | 0.1 | 0.1 | 0.0 |
| C$_3$ | 1.0 | 1.5 | 2.5 | 2.5 | 1.4 | 1.5 |
| C$_4$ | 1.2 | 1.2 | 1.5 | 1.1 | 0.6 | 0.4 |
| C$_{5+}$ | 1.0 | 1.1 | 0.8 | 0.3 | 0.1 | 0.2 |
| Selectivity (%) | 3.1 | 3.9 | 5.0 | 4.0 | 2.2 | 2.1 |
| Paraffins | | | | | | |
| C$_1$ | 13.4 | 16.5 | 23.9 | 40.7 | 54.4 | 59.5 |
| C$_2$ | 21.0 | 19.1 | 18.1 | 14.4 | 11.4 | 10.4 |
| C$_3$ | 15.1 | 14.9 | 15.3 | 12.7 | 11.2 | 9.7 |
| C$_4$ | 12.1 | 12.4 | 8.4 | 3.5 | 2.1 | 1.8 |
| C$_{5+}$ | 5.1 | 4.9 | 2.4 | 0.7 | 0.3 | 0.2 |
| Selectivity (%) | 66.7 | 67.8 | 68.1 | 72.0 | 79.4 | 81.6 |
| Aromatics | | | | | | |
| Benzene | 3.2 | 2.8 | 2.7 | 1.8 | 1.2 | 1.0 |
| Toluene | 9.7 | 8.5 | 8.0 | 5.3 | 3.4 | 3.1 |
| Ethyl benzene | 0.7 | 0.5 | 0.3 | 0.2 | 0.1 | 0.0 |
| p + m-Xylene | 9.1 | 8.3 | 7.1 | 5.6 | 4.3 | 3.5 |
| o-Xylene | 1.6 | 1.6 | 1.7 | 1.9 | 1.5 | 1.2 |
| Ethyl toluene | 1.0 | 0.8 | 0.9 | 0.9 | 0.8 | 0.6 |
| Trimethylbenzene | 2.8 | 2.7 | 2.9 | 3.5 | 1.9 | 1.5 |
| Fused-ring aromatics | 2.0 | 3.2 | 3.5 | 4.9 | 5.3 | 5.4 |
| Selectivity (%) | 30.1 | 28.4 | 27.1 | 24.1 | 18.5 | 16.3 |

[a]13.1% Ni/H-ZSM-5 + Al$_2$O$_3$ ZSM-5/Al$_2$O$_3$ = 40:60.
[b]Percentage based on carbon number of compound.

TABLE 10

Ni/ZSM-5/Al$_2$O$_3$[a] catalyzed conversion of C$_2$H$_2$/H$_2$O/H$_2$

| Feed: | | | | | | |
|---|---|---|---|---|---|---|
| C$_2$H$_2$ (ml/min) | 5.0 | 5.0 | 5.0 | 5.0 | 5.0 | 5.0 |
| H$_2$ (mg/min) | 15.0 | 15.0 | 15.0 | 15.0 | 15.0 | 15.0 |
| H$_2$O (mg/min) | 0.0 | 0.0 | 0.0 | 0.0 | 0.0 | 0.0 |
| Time on-stream (min) | 15 | 80 | 160 | 240 | 360 | 480 |
| Temperature (°C.) | 350 | 350 | 350 | 350 | 350 | 350 |
| WHSV of C$_2$H$_2$ (1/hr) | 0.8 | 0.8 | 0.8 | 0.8 | 0.8 | 0.8 |
| Conversion (%) | 100 | 100 | 99.4 | 99.0 | 98.5 | 98.0 |
| Hydrocarbon[b] | | | | | | |
| Distribution (%) | | | | | | |
| Olefins | | | | | | |
| C$_2$ | 0.1 | 0.1 | 0.2 | 0.1 | 0.0 | 0.0 |
| C$_3$ | 2.8 | 3.0 | 3.7 | 4.2 | 4.9 | 5.1 |
| C$_4$ | 9.0 | 8.7 | 9.1 | 8.5 | 9.1 | 9.2 |
| C$_{5+}$ | 6.2 | 6.8 | 7.0 | 6.2 | 5.9 | 5.5 |
| Selectivity (%) | 18.1 | 18.6 | 20.0 | 19.0 | 19.9 | 19.8 |
| Paraffins | | | | | | |
| C$_1$ | 17.9 | 17.2 | 18.0 | 17.2 | 18.5 | 18.9 |
| C$_2$ | 25.4 | 25.6 | 25.2 | 25.9 | 26.0 | 26.5 |
| C$_3$ | 12.8 | 12.5 | 11.9 | 11.9 | 11.1 | 11.5 |
| C$_4$ | 8.5 | 8.2 | 8.2 | 9.4 | 8.1 | 7.2 |
| C$_{5+}$ | 3.7 | 4.4 | 3.1 | 3.0 | 2.4 | 1.8 |
| Selectivity (%) | 68.5 | 67.9 | 66.4 | 67.4 | 66.1 | 65.9 |
| Aromatics | | | | | | |
| Benzene | 1.8 | 1.7 | 1.4 | 1.2 | 0.9 | 0.7 |
| Toluene | 5.2 | 5.1 | 4.8 | 4.2 | 2.6 | 2.2 |
| Ethyl benzene | 0.2 | 0.1 | 0.1 | 0.2 | 0.1 | 0.1 |
| p + m-Xylene | 3.4 | 3.5 | 3.8 | 4.0 | 4.1 | 4.5 |
| o-Xylene | 0.8 | 0.9 | 0.7 | 0.6 | 0.5 | 0.6 |
| Ethyl toluene | 0.7 | 0.7 | 0.5 | 0.6 | 0.7 | 0.6 |
| Trimethylbenzene | 0.5 | 0.6 | 1.0 | 1.2 | 1.6 | 1.8 |
| Fused-ring aromatics | 0.9 | 1.0 | 1.5 | 1.7 | 3.5 | 3.8 |
| Selectivity (%) | 13.5 | 13.6 | 13.8 | 13.7 | 14.0 | 14.3 |

[a]13.1% Ni/H-ZSM-5 + Al$_2$O$_3$ ZSM-5/Al$_2$O$_3$ = 40:60.
[b]Percentage based on carbon number of compound.

TABLE 11

Ni/ZSM-5/Al$_2$O$_3$[a] catalyzed conversion of C$_2$H$_2$/CH$_3$OH/H$_2$O

| Feed: | | | | | | |
|---|---|---|---|---|---|---|
| C$_2$H$_2$ (ml/min) | 20 | 20 | 20 | 20 | 20 | 20 |
| CH$_3$OH (mg/min) | 12.8 | 12.8 | 12.8 | 12.8 | 12.8 | 12.8 |
| H$_2$O (mg/min) | 1.8 | 1.8 | 1.8 | 1.8 | 1.8 | 1.8 |
| Time on-stream (min) | 15 | 80 | 180 | 260 | 380 | 480 |
| Temperature (°C.) | 350 | 350 | 350 | 350 | 350 | 350 |
| WHSV of C$_2$H$_2$ (1/hr) | 3.2 | 3.2 | 3.2 | 3.2 | 3.2 | 3.2 |
| Conversion (%) | 100 | 100 | 100 | 100 | 100 | 100 |
| Hydrocarbon[b] Distribution (%) | | | | | | |
| Olefins | | | | | | |
| C$_2$ | 0.1 | 0.1 | 0.0 | 0.1 | 0.0 | 0.0 |
| C$_3$ | 2.1 | 2.5 | 1.8 | 0.6 | 0.5 | 0.6 |
| C$_4$ | 2.0 | 1.4 | 0.7 | 0.4 | 0.2 | 0.0 |
| C$_{5-}$ | 1.7 | 0.8 | 0.2 | 0.1 | 0.0 | 0.0 |
| Selectivity (%) | 5.9 | 4.8 | 2.7 | 1.2 | 0.7 | 0.8 |
| Paraffins | | | | | | |
| C$_1$ | 12.4 | 23.7 | 42.5 | 54.1 | 57.8 | 61.3 |
| C$_2$ | 15.6 | 17.3 | 15.2 | 10.3 | 8.9 | 6.5 |
| C$_3$ | 14.8 | 18.5 | 11.8 | 9.4 | 8.0 | 7.1 |
| C$_4$ | 15.7 | 6.8 | 2.7 | 1.4 | 1.3 | 0.8 |
| C$_{5-}$ | 7.7 | 1.8 | 0.6 | 0.2 | 0.2 | 0.1 |
| Selectivity (%) | 66.2 | 68.1 | 72.8 | 75.4 | 76.2 | 75.8 |
| Aromatics | | | | | | |
| Benzene | 3.5 | 3.3 | 3.4 | 4.1 | 4.3 | 4.2 |
| Toluene | 9.8 | 8.5 | 7.3 | 6.7 | 6.8 | 6.9 |
| Ethyl benzene | 0.4 | 0.2 | 0.1 | 0.1 | 0.2 | 0.1 |
| p + m-Xylene | 7.4 | 7.2 | 6.6 | 4.8 | 4.5 | 4.3 |
| o-Xylene | 1.8 | 1.7 | 1.7 | 1.3 | 1.2 | 1.5 |
| Ethyl toluene | 1.2 | 1.6 | 0.5 | 0.6 | 0.7 | 0.3 |
| Trimethylbenzene | 2.2 | 2.3 | 2.2 | 2.1 | 0.6 | 0.4 |
| Fused-ring aromatics | 1.7 | 2.4 | 2.7 | 3.8 | 4.8 | 5.7 |
| Selectivity (%) | 28.1 | 27.2 | 24.5 | 23.5 | 23.1 | 23.4 |

[a] 13.1% Ni/H-ZSM-5 + Al$_2$O$_3$ ZSM-5/Al$_2$O$_3$ = 40:60.
[b] Percentage based on carbon number of compound.

TABLE 12

Ni/ZSM-5/Al$_2$O$_3$[a] catalyzed conversion of C$_2$H$_2$/H$_2$/H$_2$O

| Feed: | | | | | | |
|---|---|---|---|---|---|---|
| C$_2$H$_2$ (ml/min) | 5.0 | 5.0 | 5.0 | 5.0 | 5.0 | 5.0 |
| H$_2$ (ml/min) | 15.0 | 15.0 | 15.0 | 15.0 | 15.0 | 15.0 |
| H$_2$O (mg/min) | 2.7 | 2.7 | 2.7 | 2.7 | 2.7 | 2.7 |
| Time on-stream (min) | 15 | 100 | 240 | 360 | 480 | 660 |
| Temperature (°C.) | 350 | 350 | 350 | 350 | 350 | 350 |
| WHSV of C$_2$H$_2$ (1/hr) | 0.8 | 0.8 | 0.8 | 0.8 | 0.8 | 0.8 |
| Conversion (%) | 100 | 100 | 100 | 100 | 100 | 100 |
| Hydrocarbon[b] Distribution (%) | | | | | | |
| Olefins | | | | | | |
| C$_2$ | 0.1 | 0.2 | 0.1 | 0.2 | 0.1 | 0.0 |
| C$_3$ | 0.7 | 0.5 | 0.6 | 0.6 | 0.7 | 0.6 |
| C$_4$ | 0.5 | 0.6 | 0.6 | 0.4 | 0.4 | 0.5 |
| C$_{5+}$ | 0.2 | 0.4 | 0.2 | 0.1 | 0.2 | 0.2 |
| Selectivity (%) | 1.5 | 1.5 | 1.4 | 1.3 | 1.4 | 1.3 |
| Paraffins | | | | | | |
| C$_1$ | 25.4 | 25.6 | 26.1 | 26.2 | 26.4 | 26.5 |
| C$_2$ | 23.6 | 23.8 | 24.0 | 23.5 | 23.4 | 23.2 |
| C$_3$ | 12.0 | 13.8 | 13.7 | 13.9 | 13.7 | 13.6 |
| C$_4$ | 12.4 | 12.2 | 12.0 | 12.8 | 12.3 | 12.8 |
| C$_{5+}$ | 0.4 | 0.5 | 0.3 | 0.4 | 0.5 | 0.6 |
| Selectivity (%) | 75.8 | 75.9 | 77.1 | 76.8 | 77.3 | 76.7 |
| Aromatics | | | | | | |
| Benzene | 3.8 | 3.7 | 3.6 | 3.6 | 3.5 | 3.3 |
| Toluene | 7.7 | 7.6 | 7.5 | 7.6 | 7.5 | 7.4 |
| Ethyl benzene | 0.2 | 0.2 | 0.1 | 0.1 | 0.2 | 0.3 |
| p + m-Xylene | 4.6 | 4.5 | 4.7 | 4.6 | 4.4 | 4.7 |
| o-Xylene | 1.0 | 0.9 | 0.8 | 0.8 | 0.9 | 0.9 |
| Ethyl toluene | 0.5 | 0.7 | 0.8 | 0.8 | 0.7 | 0.5 |
| Trimethylbenzene | 4.5 | 4.6 | 3.8 | 4.1 | 3.9 | 4.2 |
| Fused-ring aromatics | 0.5 | 0.4 | 0.2 | 0.5 | 0.7 | 0.7 |
| Selectivity (%) | 22.8 | 22.6 | 21.5 | 22.1 | 21.4 | 22.0 |

[a] 13.1% Ni/H-ZSM-5 + Al$_2$O$_3$ ZSM-5/Al$_2$O$_3$ = 40:60.
[b] Percentage based on carbon number of compound.

TABLE 13

Ni/ZSM-5/Al$_2$O$_3$[a] catalyzed conversion of C$_2$H$_2$/CH$_4$/H$_2$O

| Feed: | | | | | | |
|---|---|---|---|---|---|---|
| C$_2$H$_2$ (ml/min) | 10 | 10 | 10 | 10 | 10 | 10 |
| CH$_4$ (mg/min) | 10 | 10 | 10 | 10 | 10 | 10 |
| H$_2$O (mg/min) | 4.1 | 4.1 | 4.1 | 4.1 | 4.1 | 4.1 |
| Time on-stream (min) | 15 | 80 | 180 | 260 | 380 | 480 |
| Temperature (°C.) | 350 | 350 | 350 | 350 | 350 | 350 |
| WHSV of C$_2$H$_2$ | 1.6 | 1.6 | 1.6 | 1.6 | 1.6 | 1.6 |
| Conversion (%) | 100 | 100 | 100 | 100 | 100 | 100 |
| Hydrocarbon[b] Distribution (%) | | | | | | |
| Olefins | | | | | | |
| C$_2$ | 0.1 | 0.1 | 0.0 | 0.0 | 0.0 | 0.0 |
| C$_3$ | 0.5 | 0.4 | 0.1 | 0.1 | 0.2 | 0.3 |
| C$_4$ | 0.4 | 0.2 | 0.2 | 0.3 | 0.2 | 0.1 |
| C$_{5+}$ | 0.1 | 0.0 | 0.0 | 0.0 | 0.0 | 0.0 |
| Selectivity (%) | 1.1 | 0.7 | 0.3 | 0.4 | 0.4 | 0.4 |
| Paraffins | | | | | | |
| C$_1$ | 67.6 | 79.9 | 82.4 | 82.9 | 84.9 | 85.9 |
| C$_2$ | 6.3 | 4.1 | 3.7 | 3.5 | 3.1 | 3.1 |
| C$_3$ | 4.4 | 2.8 | 2.4 | 2.0 | 1.6 | 1.8 |
| C$_4$ | 4.0 | 1.4 | 0.9 | 0.7 | 0.3 | 0.3 |
| C$_{5+}$ | 0.2 | 0.2 | 0.2 | 0.1 | 0.0 | 0.0 |
| Selectivity (%) | 82.5 | 88.4 | 89.6 | 89.2 | 89.9 | 91.1 |
| Aromatics | | | | | | |
| Benzene | 3.7 | 2.9 | 2.8 | 2.7 | 3.3 | 3.6 |
| Toluene | 5.8 | 3.5 | 3.1 | 3.0 | 3.6 | 2.9 |
| Ethyl benzene | 0.4 | 0.2 | 0.1 | 0.0 | 0.0 | 0.0 |
| p + m-Xylene | 2.2 | 1.1 | 0.9 | 0.9 | 0.8 | 0.6 |
| o-Xylene | 0.7 | 0.3 | 0.3 | 0.4 | 0.3 | 0.2 |
| Ethyl toluene | 0.9 | 0.1 | 0.2 | 0.3 | 0.2 | 0.1 |
| Trimethylbenzene | 2.2 | 1.2 | 1.1 | 1.1 | 0.4 | 0.4 |
| Fused-ring aromatics | 0.5 | 1.6 | 1.5 | 1.4 | 1.1 | 0.7 |
| Selectivity (%) | 16.4 | 10.9 | 10.0 | 9.8 | 9.7 | 8.5 |

[a]13.1% Ni/H-ZSM-5 + Al$_2$O$_3$; ZSM-5/Al$_2$O$_3$ = 40:60.
[b]Percentage based on carbon number of compound.

TABLE 14

Ni/ZSM-5/Al$_2$O$_3$[a] catalyzed conversion of C$_2$H$_2$/CH$_3$CHO

| Feed: | | | | | |
|---|---|---|---|---|---|
| C$_2$H$_2$ (ml/min) | 20 | 20 | 20 | 20 | 20 |
| CH$_3$CHO (mg/min) | 17.6 | 17.6 | 17.6 | 17.6 | 17.6 |
| Time on-stream (min) | 15 | 80 | 200 | 300 | 420 |
| Temperature (°C.) | 350 | 350 | 350 | 350 | 350 |
| WHSV of C$_2$H$_2$ | 1.6 | 1.6 | 1.6 | 1.6 | 1.6 |
| Conversion (%) | 98.9 | 99.1 | 100.0 | 100.0 | 100.0 |
| Hydrocarbon[b] Distribution (%) | | | | | |
| Olefins | | | | | |
| C$_2$ | 0.5 | 0.7 | 0.4 | 0.3 | 0.2 |
| C$_3$ | 5.6 | 4.4 | 1.8 | 0.7 | 0.5 |
| C$_4$ | 5.2 | 4.3 | 2.1 | 2.1 | 1.5 |
| C$_{5+}$ | 2.1 | 2.5 | 2.0 | 0.4 | 0.2 |
| Selectivity (%) | 13.4 | 11.9 | 6.3 | 3.5 | 2.4 |
| Paraffins | | | | | |
| C$_1$ | 37.0 | 40.7 | 49.9 | 50.1 | 51.3 |
| C$_2$ | 10.3 | 11.5 | 9.3 | 7.8 | 8.5 |
| C$_3$ | 11.1 | 10.1 | 10.3 | 12.4 | 12.3 |
| C$_4$ | 2.2 | 2.5 | 1.4 | 3.0 | 4.0 |
| C$_{5+}$ | 1.9 | 1.1 | 1.2 | 0.3 | 0.3 |
| Selectivity (%) | 62.5 | 65.0 | 72.1 | 74.4 | 76.1 |
| Aromatics | | | | | |
| Benzene | 4.2 | 3.7 | 3.7 | 5.1 | 5.0 |
| Toluene | 11.5 | 10.2 | 8.4 | 8.6 | 8.3 |
| Ethyl benzene | 0.7 | 0.5 | 0.6 | 0.5 | 0.4 |
| p + m-Xylene | 3.9 | 4.2 | 6.4 | 4.9 | 5.0 |
| o-Xylene | 1.1 | 1.0 | 0.8 | 1.2 | 1.0 |
| Ethyl toluene | 1.5 | 1.5 | 0.6 | 0.5 | 0.5 |
| Trimethylbenzene | 0.5 | 0.6 | 0.4 | 0.3 | 0.4 |
| Fused-ring aromatics | 0.7 | 0.8 | 0.7 | 1.0 | 0.9 |
| Selectivity (%) | 24.1 | 23.1 | 21.6 | 22.1 | 21.5 |

[a]13.1% Ni/H-ZSM-5 + Al$_2$O$_3$; ZSM-5/Al$_2$O$_3$ = 40:60.
[b]Percentage based on carbon number of compound.

The data in Tables 7–14 show that in the presence of hydrogen donating added co-reactant and a Ni/H-ZSM-5/Al$_2$O$_3$ catalyst, acetylene is efficiently and continuously converted to hydrocarbon products. In the absence of water, initial conversion is complete but falls rapidly with time (see Table 1).

EXAMPLE 5

Co/H-ZSM-5/Al$_2$O$_3$ Catalyst

Acetylene/water feedstocks were catalytically converted to olefins, paraffins and aromatics under the conditions described in Example 2 except that a 13.1% cobalt-containing catalyst was used in place of the nickel-loaded catalyst. Results are shown in Table 15. The conversion rate was equally efficient as the Ni catalyst, see Table 8, but selectivity was different in that overall yield of aromatics was lower when cobalt-containing catalyst was used.

TABLE 15

Product distribution in the Co/H-ZSM-5/Al$_2$O$_3$[a] catalyzed conversion of C$_2$H$_2$/H$_2$O

| Feed: | | | | | | |
|---|---|---|---|---|---|---|
| C$_2$H$_2$ (ml/min) | 20 | 20 | 20 | 20 | 20 | 20 |
| H$_2$O (mg/min) | 4.7 | 4.7 | 4.7 | 4.7 | 4.7 | 4.7 |
| Time on-stream (min) | 15 | 80 | 180 | 260 | 380 | 480 |

TABLE 15-continued

| Product distribution in the Co/H-ZSM-5/Al₂O₃ᵃ catalyzed conversion of C₂H₂/H₂O | | | | | | |
|---|---|---|---|---|---|---|
| Temperature (°C.) | 350 | 350 | 350 | 350 | 350 | 350 |
| WHSV (1/hr) | 3.2 | 3.2 | 3.2 | 3.2 | 3.2 | 3.2 |
| Conversion (%) | 100 | 100 | 100 | 100 | 100 | 100 |
| Hydrocarbonᵇ Distribution (%) | | | | | | |
| Olefins | | | | | | |
| $C_2$ | 0.2 | 0.1 | 0.2 | 0.1 | 0.0 | 0.0 |
| $C_3$ | 0.6 | 0.2 | 0.3 | 0.2 | 0.3 | 0.3 |
| $C_4$ | 0.4 | 0.2 | 0.2 | 0.1 | 0.2 | 0.2 |
| $C_{5+}$ | 0.1 | 0.0 | 0.0 | 0.0 | 0.0 | 0.0 |
| Selectivity (%) | 1.3 | 0.5 | 0.7 | 0.4 | 0.5 | 0.5 |
| Paraffins | | | | | | |
| $C_1$ | 62.4 | 67.3 | 71.5 | 75.5 | 77.3 | 77.3 |
| $C_2$ | 11.0 | 10.2 | 9.2 | 7.7 | 7.6 | 7.8 |
| $C_3$ | 6.0 | 4.7 | 4.0 | 2.8 | 2.6 | 2.6 |
| $C_4$ | 1.4 | 0.7 | 0.9 | 0.9 | 0.5 | 0.5 |
| $C_{5+}$ | 0.3 | 0.2 | 0.2 | 0.2 | 0.1 | 0.0 |
| Selectivity (%) | 81.1 | 83.1 | 85.8 | 87.1 | 88.1 | 88.2 |
| Aromatics | | | | | | |
| Benzene | 2.4 | 3.5 | 3.7 | 3.9 | 4.1 | 4.7 |
| Toluene | 4.7 | 6.1 | 5.2 | 4.8 | 4.4 | 4.3 |
| Ethyl benzene | 0.2 | 0.2 | 0.1 | 0.1 | 0.0 | 0.0 |
| p + m-Xylene | 3.3 | 3.5 | 2.3 | 2.0 | 1.7 | 1.2 |
| o-Xylene | 0.5 | 0.8 | 0.7 | 0.6 | 0.5 | 0.2 |
| Ethyl toluene | 3.6 | 0.7 | 0.5 | 0.4 | 0.2 | 0.3 |
| Trimethylbenzene | 2.4 | 1.2 | 0.8 | 0.5 | 0.3 | 0.5 |
| Fused-ring aromatics | 0.5 | 0.4 | 0.2 | 0.2 | 0.2 | 0.1 |
| Selectivity (%) | 17.6 | 16.4 | 13.8 | 12.5 | 11.4 | 11.3 |

ᵃ13.1% Co/H-ZSM-5 + Al₂O₃; H-ZSM-5/Al₂O₃ = 40:60.
ᵇPercentage based on carbon number of compound.

EXAMPLE 6

Effect of Temperature on Catalyzed Conversion of Acetylene

A fixed ratio water/acetylene feedstock was converted to hydrocarbon products under the conditions described in Example 2, except that reaction temperature was varied over a range of 200°-500° C. As shown in Table 16, optimal temperatures for complete conversion were at or above 350° C. A desirable aromatic content in terms of product distribution is observed at an optimal temperature near 350° C. under reaction conditions used in this example.

TABLE 16

| Product distribution as a function of reaction temperature in the Ni/ZSM-5/Al₂O₃ᵃ catalyzed conversion of C₂H₂/H₂O | | | | | | | |
|---|---|---|---|---|---|---|---|
| Feed: | | | | | | | |
| C₂H₂ (ml/min) | 20 | 20 | 20 | 20 | 20 | 20 | 20 |
| H₂O (mg/min) | 4.7 | 4.7 | 4.7 | 4.7 | 4.7 | 4.7 | 4.7 |
| Temperature (°C.) | 200 | 250 | 300 | 350 | 400 | 450 | 500 |
| WHSV (1/hr) | 3.2 | 3.2 | 3.2 | 3.2 | 3.2 | 3.2 | 3.2 |
| Conversion (%) | 64.9 | 82.2 | 95.1 | 100 | 100 | 100 | 100 |
| Hydrocarbonᵇ Distribution (%) | | | | | | | |
| Olefins | | | | | | | |
| $C_2$ | 0.3 | 0.2 | 0.1 | 0.2 | 0.1 | 0.2 | 0.2 |
| $C_3$ | 47.7 | 38.8 | 36.5 | 14.3 | 8.4 | 3.8 | 0.2 |
| $C_4$ | 5.5 | 3.5 | 1.2 | 1.4 | 0.3 | 0.1 | 0.2 |
| $C_{5+}$ | 2.5 | 1.1 | 0.4 | 2.2 | 0.1 | 0.0 | 0.1 |
| Selectivity (%) | 56.0 | 43.6 | 38.2 | 18.1 | 8.9 | 4.1 | 0.7 |
| Paraffins | | | | | | | |
| $C_1$ | 18.7 | 21.9 | 23.0 | 23.7 | 50.1 | 66.4 | 86.9 |
| $C_2$ | 7.1 | 15.5 | 20.2 | 16.5 | 8.9 | 5.5 | 1.1 |
| $C_3$ | 1.1 | 0.9 | 0.6 | 2.2 | 1.7 | 0.5 | 0.0 |
| $C_4$ | 12.1 | 13.4 | 11.2 | 8.7 | 1.8 | 0.5 | 0.3 |
| $C_{5+}$ | 3.4 | 1.2 | 0.7 | 1.1 | 0.8 | 0.2 | 0.0 |
| Selectivity (%) | 43.3 | 52.9 | 55.7 | 52.2 | 63.3 | 73.1 | 88.3 |
| Aromatics | | | | | | | |
| Benzene | 0.6 | 1.0 | 2.4 | 7.6 | 8.1 | 5.7 | 0.6 |
| Toluene | 0.4 | 0.9 | 2.0 | 11.0 | 7.9 | 3.2 | 0.3 |
| Ethyl benzene | 0.0 | 0.0 | 0.0 | 0.4 | 0.1 | 0.0 | 0.0 |
| p + m-Xylene | 0.3 | 0.6 | 0.8 | 6.5 | 2.3 | 1.1 | 0.2 |
| o-Xylene | 0.0 | 0.1 | 0.2 | 1.4 | 1.2 | 0.2 | 0.1 |
| Ethyl toluene | 0.4 | 0.8 | 0.3 | 1.1 | 2.7 | 3.1 | 2.4 |
| Trimethylbenzene | 0.1 | 0.2 | 0.3 | 1.3 | 4.2 | 6.7 | 3.5 |
| Fused-ring aromatics | 0.1 | 0.1 | 0.2 | 0.6 | 1.4 | 3.0 | 4.1 |

TABLE 16-continued

Product distribution as a function of reaction temperature
in the Ni/ZSM-5/$Al_2O_3$[a] catalyzed conversion of $C_2H_2/H_2O$

| Selectivity (%) | 1.9 | 3.7 | 6.2 | 29.9 | 27.9 | 23.0 | 11.2 |

[a]13.1% Ni/H-ZSM-5 – $Al_2O_3$ ZSM-5/$Al_2O_3$ = 40:60.
[b]Percentage based on carbon number of compound.

EXAMPLE 7

Effect of Nickel Content on Catalyst Efficiency

The effect of varying the nickel content of the Ni/H-ZSM-5/$Al_2O_3$ catalyst is shown in Table 17. Catalyst was prepared as described in Example 1, using different concentrations of $Ni(NO_3)_2$ solutions to provide variations in percent Ni loading. Results indicate a substantial increase in the percent acetylene conversion for nickel loadings above 5% under the particular reaction conditions employed.

TABLE 17

Product distribution and $C_2H_2$ conversion efficiency as a function of Ni loading of ZSM-5/$Al_2O_3$[a] catalyst

| Feed: | | | | | | |
|---|---|---|---|---|---|---|
| $C_2H_2$ (ml/min) | 20 | 20 | 20 | 20 | 20 | 20 |
| $H_2O$ (mg/min) | 4.7 | 4.7 | 4.7 | 4.7 | 4.7 | 4.7 |
| Ni content (%) | 0.0 | 5.0 | 10.0 | 13.2 | 20.0 | 35.0 |
| Temperature (°C.) | 350 | 350 | 350 | 350 | 350 | 350 |
| WHSV (1/hr) | 3.2 | 3.2 | 3.2 | 3.2 | 3.2 | 3.2 |
| Conversion (%) | 2.2 | 4.3 | 99.1 | 100 | 100 | 100 |
| Hydrocarbon[b] Distribution (%) | | | | | | |
| Olefins | | | | | | |
| $C_2$ | 0.2 | 0.1 | 0.9 | 0.0 | 0.2 | 0.2 |
| $C_3$ | 0.2 | 0.2 | 1.8 | 1.5 | 0.6 | 0.5 |
| $C_4$ | 4.3 | 2.0 | 7.0 | 0.2 | 0.4 | 0.4 |
| $C_{5+}$ | 0.4 | 2.2 | 7.4 | 1.5 | 0.1 | 0.2 |
| Selectivity (%) | 5.1 | 4.5 | 17.1 | 3.2 | 1.3 | 1.3 |
| Paraffins | | | | | | |
| $C_1$ | 0.2 | 4.2 | 24.5 | 24.9 | 36.6 | 32.9 |
| $C_2$ | 0.0 | 0.4 | 21.0 | 16.9 | 15.0 | 17.6 |
| $C_3$ | 4.2 | 11.4 | 13.4 | 14.8 | 10.8 | 10.5 |
| $C_4$ | 12.5 | 15.1 | 1.6 | 9.4 | 4.5 | 5.4 |
| $C_{5+}$ | 0.5 | 0.6 | 4.8 | 0.4 | 0.5 | 1.2 |
| Selectivity (%) | 17.4 | 31.7 | 65.3 | 66.4 | 67.4 | 67.6 |
| Aromatics | | | | | | |
| Benzene | 0.5 | 6.1 | 5.6 | 7.4 | 11.9 | 9.7 |
| Toluene | 2.2 | 4.7 | 5.1 | 10.3 | 12.0 | 13.6 |
| Ethyl benzene | 0.0 | 0.0 | 0.2 | 0.4 | 0.4 | 0.5 |
| p + m-Xylene | 8.8 | 1.2 | 3.1 | 6.1 | 2.5 | 3.3 |
| o-Xylene | 1.0 | 0.5 | 0.8 | 1.4 | 0.9 | 0.6 |
| Ethyl toluene | 0.5 | 0.2 | 0.7 | 1.9 | 1.5 | 1.2 |
| Trimethylbenzene | 0.9 | 1.1 | 1.2 | 2.1 | 1.4 | 1.4 |
| Fused-ring aromatics | 63.8 | 50.0 | 0.9 | 0.5 | 0.7 | 0.8 |
| Selectivity (%) | 77.7 | 63.8 | 17.6 | 30.4 | 31.3 | 31.1 |

[a]Ni/H-ZSM-5 + $Al_2O_3$ H-ZSM-5/$Al_2O_3$ = 40:60. Time on stream: 120 min.
[b]Percentage based on carbon number of compound.

REFERENCES

The references cited within the text are incorporated herein by reference to the extent they supplement, explain, provide a background for or teach methodology, techniques and/or compositions employed herein.

1. Allenger, V. M., Brown, J. R., Clugston, D., Ternan and McLean, D. D., Appl. Cat., 39, 191–211 (1988).
2. Allenger, V. M., Fairbridge, C., McLean, D. D., and Ternan, M., J. Catal., 105, 71–80 (1987).
3. Allenger, V. M., McLean, D. D. and Ternan, M., Fuel, 66, 435–436 (1987).
4. Chevreau, T., Cornet, D., Marzin, M. and Roudias, K., Bull. Soc. Chim, France, #3, 483–488 (1988).
5. Seddon, D., BHP Technical Bulletin, 27, 84–88 (1983).
6. Seddon, D., Larkins, F. P., and Mole, T., Federal Research in Progress (Dept. of Energy), 1984–1986, "Catalytic conversion of Light Hydrocarbons to Liquid Fuels."
7. Tedeschi, R. J. in Acetylene Based Chemicals form Coal and Other Natural Resources, Marcel Dekker, Inc., New York, N.Y. 10016 (1982).
8. Tsai, P. and Anderson, J. R., J. Catal., 80, 207–214 (1983).
9. White, N., Kagi, D. A., Creer, J. G. and Tsai, P., U.S. Pat. No. 4,424,401, Jan. 3, 1984.

Although the present invention has been described in some detail by way of illustration and example for purposes of clarity and understanding, it will be obvious that certain changes and modifications may be practiced within the scope of the claims. The present invention has been described in terms of particular embodiments found by the inventors to comprise preferred modes of practice of the invention. It will be appreciated by those of skill in the art that in light of the present disclosure numerous modifications and changes can be made in the particular embodiments exemplified without departing from the intended scope of the invention. For example, various modifications of feedstocks are envisioned, including nitrogen or sulfur containing compounds, such that selective syntheses of compounds could be effected, for example aromatic heterocyclics. In a similar vein, although the process described is carried out at atmospheric pressure, one can anticipate successful conversions at pressures both above and below one atmosphere. These and obvious related modifications are contemplated to be within the scope of the claims.

What is claimed is:

1. An efficient process for producing a fuel or fuel additive, comprising the steps:
   combining an alkyne with a potential hydrogen donor compound to form a feedstock;
   obtaining a nickel or cobalt-containing zeolite catalyst wherein the nickel or cobalt is in free-metal form; and
   contacting said feedstock with said catalyst to produce a fuel or fuel additive comprising monocyclic aromatic hydrocarbons.

2. The process of claim 1 Wherein the alkyne is propyne, 1-butyne or 2-butyne.

3. The process of claim 1 wherein the alkyne is acetylene.

4. The process of claim 1 wherein the hydrogen donor compound is water.

5. The process of claim 1 wherein the hydrogen donor compound is a lower molecular weight alcohol.

6. The process of claim 5 wherein the lower molecular weight alcohol is methanol.

7. The process of claim 1 wherein the hydrogen donor compound is a lower molecular weight aldehyde.

8. The process of claim 7 wherein the lower molecular weight aldehyde is acetaldehyde.

9. The process of claim 7 wherein the lower molecular weight aldehyde is propionaldehyde.

10. The process of claim 1 wherein the zeolite catalyst is Co/H-ZSM-5/$Al_2O_3$.

11. The process of claim 1 wherein the zeolite catalyst is Ni/H-ZSM-5/$Al_2O_3$.

12. The process of claim 11 wherein the zeolite catalyst contains at least 5% Ni.

13. The process of claim 11 wherein the zeolite catalyst contains about 13% Ni.

14. The process of claim 1 wherein the feedstock being at atmospheric pressure, is heated to a temperature between about 300°–400° C.

15. The process of claim 1 wherein the contacting is for a period of time effective to provide a hydrocarbon fuel.

16. A hydrocarbon mixture produced by the process of claim 1.

17. The hydrocarbon mixture of claim 16 comprising lower olefins, monocyclic aromatic hydrocarbons, and paraffins.

18. The hydrocarbon mixture of claim 16 produced by contacting a feed stream comprising acetylene and water with Ni/H-ZSM-5/$Al_2O_3$ catalyst at a temperature of about 350°–400° C. at atmospheric pressure.

19. The hydrocarbon mixture of claim 17 wherein the monocyclic aromatic hydrocarbons are about 30% of total hydrocarbons.

* * * * *